United States Patent
Yang et al.

(10) Patent No.: US 9,652,829 B2
(45) Date of Patent: May 16, 2017

(54) VIDEO SUPER-RESOLUTION BY FAST VIDEO SEGMENTATION FOR BOUNDARY ACCURACY CONTROL

(71) Applicant: Samsung Electronics Co., Ltd., Suwon-si, Gyeonggi-do (KR)

(72) Inventors: Bo Yang, Cerritos, CA (US); Li Tao, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 14/862,020

(22) Filed: Sep. 22, 2015

(65) Prior Publication Data
US 2016/0217552 A1    Jul. 28, 2016

Related U.S. Application Data

(60) Provisional application No. 62/106,618, filed on Jan. 22, 2015.

(51) Int. Cl.
*G06K 9/48*     (2006.01)
*G06T 3/40*     (2006.01)
(Continued)

(52) U.S. Cl.
CPC ......... *G06T 3/4053* (2013.01); *G06K 9/4604* (2013.01); *G06K 9/4642* (2013.01);
(Continued)

(58) Field of Classification Search
CPC . G06T 3/4053; G06T 7/11; G06T 7/90; G06T 9/52; G06T 9/4604; G06T 9/4642;
(Continued)

(56) References Cited

U.S. PATENT DOCUMENTS

| 5,231,677 A | 7/1993 | Mita et al. |
| 5,517,687 A | 5/1996 | Niehenke et al. |

(Continued)

FOREIGN PATENT DOCUMENTS

| EP | 2416557 A1 | 2/2012 |
| KR | 1020110032402 A | 3/2001 |

(Continued)

OTHER PUBLICATIONS

U.S. Notice of Allowance for U.S. Appl. No. 14/214,056 mailed Nov. 25, 2015.

(Continued)

*Primary Examiner* — Samir Ahmed
(74) *Attorney, Agent, or Firm* — Sherman IP LLP; Kenneth L. Sherman; Steven Laut

(57) ABSTRACT

A method includes generating, by a processor, a label map by labeling pixels in an image. A percentage of a first and second type of texture pixels is determined based on the label map to generate a texture map. The texture map is updated. A directional edge map is generated based on a data correlation analysis based on the texture map and the label map. A gain map with boundaries and smoothing is generated using localized pixels based on information from one or more of the label map, the texture map, and the directional edge map. An enhancement controlled upscaled image frame is generated using one or more of the label map, the texture map, the directional edge map and the gain map as a weight factor.

30 Claims, 8 Drawing Sheets

(51) Int. Cl.

| | | |
|---|---|---|
| *G06K 9/46* | (2006.01) | |
| *G06K 9/52* | (2006.01) | |
| *G06T 7/40* | (2017.01) | |
| *G06K 9/62* | (2006.01) | |
| *G06T 7/11* | (2017.01) | |
| *G06T 7/90* | (2017.01) | |
| *G06T 7/136* | (2017.01) | |

(52) U.S. Cl.
CPC .............. *G06K 9/4652* (2013.01); *G06K 9/52* (2013.01); *G06K 9/6218* (2013.01); *G06T 7/11* (2017.01); *G06T 7/408* (2013.01); *G06T 7/90* (2017.01); *G06K 2009/4666* (2013.01); *G06T 7/136* (2017.01); *G06T 2207/10024* (2013.01)

(58) Field of Classification Search
CPC ................... G06T 9/6218; G06T 7/136; G06T 2207/10024; G06K 9/4652; G06K 2009/4666
See application file for complete search history.

(56) References Cited

U.S. PATENT DOCUMENTS

| | | | |
|---|---|---|---|
| 6,266,443 B1 | 7/2001 | Vetro et al. | |
| 6,716,175 B2 | 4/2004 | Geiser et al. | |
| 6,985,636 B1 | 1/2006 | Semenchenko | |
| 7,068,817 B2 | 6/2006 | Bourg et al. | |
| 7,139,036 B2 | 11/2006 | Wang et al. | |
| 7,203,381 B2 | 4/2007 | Motomura | |
| 7,221,761 B1 | 5/2007 | Deshpande et al. | |
| 7,292,733 B2 | 11/2007 | Monobe et al. | |
| 7,302,112 B2 | 11/2007 | Shimazaki et al. | |
| 7,315,656 B2 | 1/2008 | Von Thal et al. | |
| 7,362,900 B2 | 4/2008 | Urano et al. | |
| 7,587,099 B2 | 9/2009 | Szeliski et al. | |
| 7,702,175 B2 | 4/2010 | Yazaki et al. | |
| 7,817,872 B2 | 10/2010 | Michel et al. | |
| 7,885,486 B2 | 2/2011 | Kubota et al. | |
| 8,107,765 B2 | 1/2012 | Hwang et al. | |
| 8,175,385 B2 | 5/2012 | Steinberg et al. | |
| 8,213,737 B2 | 7/2012 | Steinberg et al. | |
| 8,233,744 B2 | 7/2012 | Tezuka | |
| 8,254,726 B2 | 8/2012 | Ichihashi et al. | |
| 8,260,087 B2 | 9/2012 | Messing et al. | |
| 8,335,394 B2 | 12/2012 | Zhu et al. | |
| 8,406,572 B2 | 3/2013 | Kabasawa | |
| 8,428,386 B2 | 4/2013 | Yoshimura et al. | |
| 8,433,148 B2 | 4/2013 | Porikli et al. | |
| 8,442,337 B2 | 5/2013 | Zuo et al. | |
| 8,452,110 B2 | 5/2013 | Carmel et al. | |
| 8,472,724 B2 | 6/2013 | Lertrattanapanich et al. | |
| 8,472,745 B2 | 6/2013 | Kameyama | |
| 8,494,227 B2 | 7/2013 | Prokoski | |
| 8,531,601 B2 | 9/2013 | Kobayashi | |
| 8,593,542 B2 | 11/2013 | Steinberg et al. | |
| 8,594,448 B2 | 11/2013 | Nachlieli et al. | |
| 8,594,452 B2 | 11/2013 | Chen | |
| 8,666,177 B2 | 3/2014 | Chen et al. | |
| 8,743,963 B2 | 6/2014 | Kanumuri | |
| 8,780,109 B2 | 7/2014 | Hyodo et al. | |
| 8,805,113 B2 | 8/2014 | Moriya et al. | |
| 8,818,109 B2 | 8/2014 | Kisilev et al. | |
| 8,873,835 B2 | 10/2014 | Asente et al. | |
| 8,948,533 B2 | 2/2015 | Golan et al. | |
| 8,983,177 B2 | 3/2015 | Tuzel et al. | |
| 9,031,346 B2 | 5/2015 | Damkat | |
| 9,066,025 B2 | 6/2015 | Tao et al. | |
| 2004/0136570 A1 | 7/2004 | Ullman et al. | |
| 2006/0050783 A1 | 3/2006 | Le Dinh et al. | |
| 2006/0115176 A1* | 6/2006 | Kanamori | G06T 5/003 382/266 |
| 2006/0115184 A1* | 6/2006 | Michel | G06T 3/403 382/299 |
| 2006/0222258 A1 | 10/2006 | Lertrattanapanich | |
| 2007/0019887 A1* | 1/2007 | Nestares | G06T 3/4053 382/299 |
| 2007/0223834 A1 | 9/2007 | Lertrattanapanich | |
| 2008/0175519 A1* | 7/2008 | Nagumo | G06T 3/4076 382/299 |
| 2009/0034875 A1 | 2/2009 | Park | |
| 2009/0226097 A1* | 9/2009 | Matsumoto | G06T 3/403 382/199 |
| 2009/0297039 A1 | 12/2009 | Reinpoldt, III | |
| 2009/0324090 A1* | 12/2009 | Tanaka | H04N 7/0125 382/199 |
| 2010/0183232 A1* | 7/2010 | Oryoji | G06T 3/4053 382/238 |
| 2010/0183238 A1 | 7/2010 | Ayzenberg et al. | |
| 2010/0260433 A1* | 10/2010 | Zhang | G06T 3/403 382/264 |
| 2010/0322513 A1 | 12/2010 | Xu et al. | |
| 2011/0235939 A1 | 9/2011 | Peterson et al. | |
| 2012/0212573 A1 | 8/2012 | Park | |
| 2012/0219229 A1 | 8/2012 | Springer et al. | |
| 2012/0301049 A1 | 11/2012 | Mori | |
| 2013/0044965 A1 | 2/2013 | Chien et al. | |
| 2013/0208810 A1 | 8/2013 | Shen | |
| 2013/0243313 A1 | 9/2013 | Civit et al. | |
| 2014/0003734 A1 | 1/2014 | Umansky et al. | |
| 2014/0258941 A1 | 9/2014 | Lim et al. | |
| 2014/0267347 A1 | 9/2014 | Tao et al. | |
| 2014/0270564 A1 | 9/2014 | Tao et al. | |
| 2014/0270566 A1 | 9/2014 | Tao et al. | |
| 2015/0003725 A1 | 1/2015 | Wan | |

FOREIGN PATENT DOCUMENTS

| | | | |
|---|---|---|---|
| KR | 1020050047373 A | | 5/2005 |
| KR | 1020050048529 A | | 5/2005 |
| KR | 1020110117474 A | | 10/2011 |
| WO | 2011068360 A2 | | 6/2011 |

OTHER PUBLICATIONS

U.S. Notice of Allowance for U.S. Appl. No. 14/214,081 mailed Jan. 22, 2016.

U.S. Final Office Action for U.S. Appl. No. 14/214,114 mailed Feb. 5, 2016.

Silver, B. et al., "Contrast Entropy Based Image Enhancement and Logarithmic Transform Coefficient Histogram Shifting", Proceedings of the 2005 IEEE International Conference on Acoustics, Speech and Signal Processing (ICASSP'05), Mar. 23, 2005, pp. 633-636, IEEE, United States.

Xia, J. et al., "Wavelet Transform Coefficient Histogram-Based Image Enhancement Algoritms", Proceedings of Mobile Multimedia Image Processing Security, and Applications (SPIE7708), Apr. 20, 2010, pp. 1-12, United States.

U.S. Notice of Allowance for U.S. Appl. No. 14/214,114 mailed Aug. 23, 2016.

U.S. Advisory Action for U.S. Appl. No. 14/214,114 mailed Apr. 22, 2016.

U.S. Supplemental Notice of Allowability for U.S. Appl. No. 14/214,114 mailed Nov. 14, 2016.

International Search Report and Written Opinion dated Jul. 7, 2014 for International PCT Application No. PCT/KR2014/002247 from Korean Intellectual Property Office, pp. 1-8, Daejeon, Republic of Korea.

International Search Report and Written Opinion dated Jul. 22, 2014 for International PCT Application No. PCT/KR2014/002246 from Korean Intellectual Property Office, pp. 1-9, Daejeon, Republic of Korea.

Piao, Y. et al., "Image resolution enhancement using inter-subband correlation in wavelet domain", Proceedings of the 2007 International Conference on Image Processing (ICIP 2007), Sep. 16, 20078-Oct. 19, 2007, pp. 445-448, vol. 1, IEEE, United States.

International Search Report and Written Opinion dated Jul. 27, 2014 for International PCT Application No. PCT/KR2014/002251 from Korean Intellectual Property Office, pp. 1-8, Daejeon, Republic of Korea.

(56) References Cited

OTHER PUBLICATIONS

Abramov, A. et al., "Real-time image segmentation on a GPU", Facing the multicore-challenge, Jan. 1, 2010, pp. 131-142, Springer-Verlag, Berlin, Heidelberg.
Tian, J. et al., "A survey on super-resolution imaging", Signal, Image and Video Processing, Feb. 3, 2011, pp. 329-342, vol. 5, Issue 3, Springer-Verlag, United States.
U.S. Non-Final Office Action for U.S. Appl. No. 14/214,056 mailed Jul. 29, 2015.
U.S. Non-Final Office Action for U.S. Appl. No. 14/214,081 mailed Aug. 5, 2015.
U.S. Non-Final Office Action for U.S. Appl. No. 14/214,348 mailed Jul. 16, 2014.
U.S. Notice of Allowance for U.S. Appl. No. 14/214,348 mailed Mar. 2, 2015.
U.S. Non-Final Office Action for U.S. Appl. No. 14/214,114 mailed Aug. 27, 2015.

* cited by examiner

VIDEO SUPER-RESOLUTION BY FAST VIDEO SEGMENTATION FOR BOUNDARY ACCURACY CONTROL

CROSS-REFERENCE TO RELATED APPLICATIONS

This application claims the priority benefit of U.S. Provisional Patent Application Ser. No. 62/106,618, filed Jan. 22, 2015, which is incorporated herein by reference in its entirety.

TECHNICAL FIELD

One or more embodiments relate generally to video displays, and in particular, to generating a high resolution image frame from an input image frame using fast segmentation for boundary control accuracy.

BACKGROUND

Video super-resolution has attracted more and more attention from researchers and engineers due to its potential in many applications. In attempting to generate a super-resolution image, a difficult issue is to produce enhanced details from an upscaled image.

SUMMARY

One or more embodiments relate to generating a high resolution image frame from an input image frame using fast segmentation for boundary accuracy control. In one embodiment, a method includes generating, by a processor, a label map by labeling pixels in an image frame based on a closest color cluster center to the pixels. A percentage of a first type of texture pixels and a percentage of a second type of texture pixels is determined based on the label map to generate a texture map of the image frame. The texture map is updated by updating texture probability as a local average with an updating factor for a particular difference between the percentage of the first type of texture pixels and the percentage of the second type of texture pixels. A directional edge map is generated based on a data correlation analysis by removing a correlation response in texture regions based on the texture map and the label map. A gain map with boundaries and smoothing is generated using localized pixels based on information from one or more of the label map, the texture map, and the directional edge map. An enhancement controlled upscaled image frame is generated based on using one or more of the label map, the texture map, the directional edge map and the gain map as a weight factor.

In one embodiment, an apparatus comprises a memory device configured to receive an image frame. A processor is configured to: generate a label map by labeling pixels in the image frame based on a closest color cluster center to the pixels; determine a percentage of a first type of texture pixels and a percentage of a second type of texture pixels based on the label map to generate a texture map of the image frame; update the texture map by updating texture probability as a local average with an updating factor for a particular difference between the percentage of the first type of texture pixels and the percentage of the second type of texture pixels; generate a directional edge map based on a data correlation analysis by removing a correlation response in texture regions based on the texture map and the label map; generate a gain map with boundaries and smoothing using localized pixels based on information from one or more of the label map, the texture map, and the directional edge map; and construct an enhancement controlled upscaled image frame based on using one or more of the label map, the texture map, the directional edge map and the gain map as a weight factor.

In one embodiment, a non-transitory processor-readable medium that includes a program that when executed by a processor performs a method. The method comprises generating, by the processor, a label map by labeling pixels in an image frame based on a closest color cluster center to the pixels. A percentage of a first type of texture pixels and a percentage of a second type of texture pixels is determined based on the label map to generate a texture map of the image frame. The texture map is updated by updating texture probability as a local average with an updating factor for a particular difference between the percentage of the first type of texture pixels and the percentage of the second type of texture pixels. A directional edge map is generated based on a data correlation analysis by removing a correlation response in texture regions based on the texture map and the label map. A gain map with boundaries and smoothing is generated using localized pixels based on information from one or more of the label map, the texture map, and the directional edge map. An enhancement controlled upscaled image frame is generated based on using one or more of the label map, the texture map, the directional edge map and the gain map as a weight factor.

These and other features, aspects and advantages of the one or more embodiments will become understood with reference to the following description, appended claims and accompanying figures.

DETAILED DESCRIPTION

Figure 1:
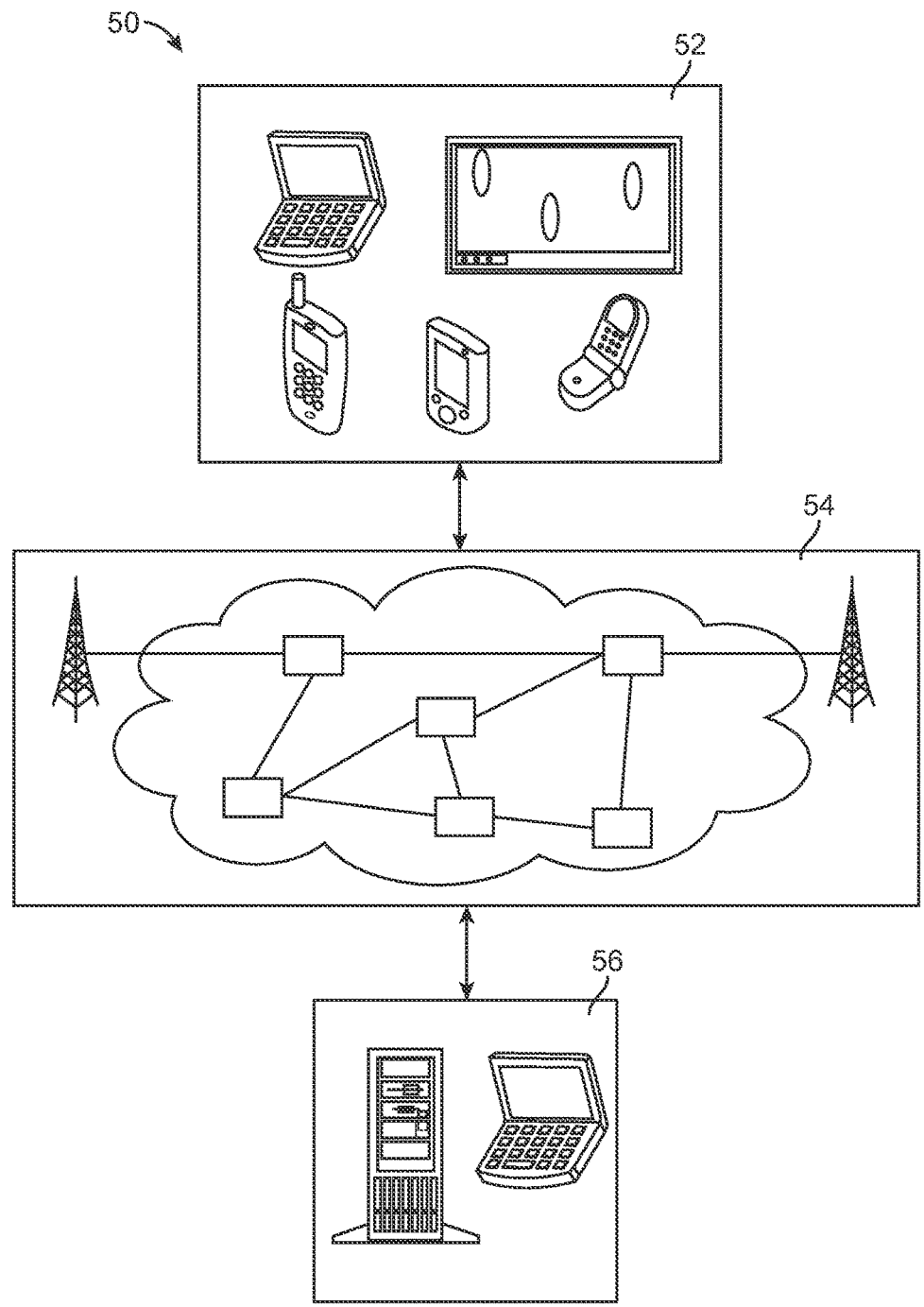
FIG. 1 shows an electronic system with a fast segmentation for boundary accuracy control mechanism, according to one embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide for generating a high resolution image frame from an input image frame using fast segmentation and boundary accuracy control. In one embodiment, a method includes generating, by a processor, a label map by labeling pixels in an image frame based on a closest color cluster center to the pixels. A percentage of a first type of texture pixels and a percentage of a second type of texture pixels is determined based on the label map to generate a texture map of the image frame. The texture map is updated by updating texture probability as a local average with an updating factor for a particular difference between the percentage of the first type of texture pixels and the percentage of the second type of texture pixels. A directional edge map is generated based on a data correlation analysis by removing a correlation response in texture regions based on the texture map and the label map. A gain map with boundaries and smoothing is generated using localized pixels based on information from one or more of the label map, the texture map, and the directional edge map. An enhancement controlled upscaled image frame is generated based on using one or more of the label map, the texture map, the directional edge map and the gain map as a weight factor.

A person skilled in the art would appreciate that the format with which image information is expressed is not critical to some embodiments. For example, in some embodiments, image information is presented in the format of I(X, Y), where X and Y are two coordinates that define the location of a pixel in an image. Three-dimensional image information may be presented by a format of I(X, Y, Z) with related information for color of the pixel. In one embodiment, the image information also includes an intensity or brightness element.

For expository purposes, the term "horizontal" as used herein refers to the horizontal direction seen when viewing the drawing as indicated by the figure designation of "FIG.". The term "vertical" refers to a direction perpendicular to the horizontal as just defined. Terms, such as "above", "below", "bottom", "top", "side", "higher", "lower", "upper", "over", and "under", are defined with respect to the horizontal, as shown in the figures.

The term "image" referred to herein may include a two-dimensional image, three-dimensional image, video frame, a computer file representation, an image from a camera, a video frame, or a combination thereof. For example, the image may be a machine readable digital file, a physical photograph, a digital photograph, a motion picture frame, a video frame, an x-ray image, a scanned image, or a combination thereof. The image may be generated from pixels arranged in a rectangular array. The image may include an x-axis along the direction of the rows and a y-axis along the direction of the columns.

FIG. 1 shows an electronic system 50 with an edge enhancement and optimization mechanism in one or more embodiments. The electronic system 50 includes a first device 52, such as a client or a server, connected to a second device 56, such as a client or server. The first device 52 may communicate with the second device 52 with a communication path 54, such as a wireless or wired network.

In one example, the first device 52 may be of any of a variety of ultra-high definition (UD) or 4K display devices, such as a UD television (UDTV) or 4K TV, tablet device, smart phone, personal digital assistant (PDA), a notebook computer, a liquid crystal display (LCD) system, a wearable device, mobile computing device, or other multi-functional displays or entertainment devices. The first device 52 may couple directly or indirectly to the communication path 54 to communicate with the second device 56 or may be a stand-alone device.

For illustrative purposes, the display system 50 is described with the first device 52 as a display device, although it is understood that the first device 52 may be a variety of different types of devices. For example, the first device 52 may also be a device for presenting images or a multi-media presentation. A multi-media presentation may be a presentation including sound, a sequence of streaming images or a video feed, or a combination thereof. As an example, the first device 52 may be a UDTV, or any other type of UD display device (e.g., monitor, video panel, HUD, smart telephone, tablet device, video device, gaming device, etc.).

The second device 56 may be any of a variety of centralized or decentralized computing devices, image or video transmission devices. For example, the second device 56 may be a multimedia computer, a tablet, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 56 may be a signal receiver for receiving broadcast or live stream signals, such as a television receiver, a cable box, a satellite dish receiver, or a web enabled device.

The second device 56 may be centralized in a single room, distributed across different rooms, distributed across different geographical locations, embedded within a telecommunications network, etc. The second device 56 may have a means for coupling with the communication path 54 to communicate with the first device 52.

For illustrative purposes, the electronic system 50 is described with the second device 56 as a computing device, although it is understood that the second device 56 may be different types of devices. Also for illustrative purposes, the display system 50 is shown with the second device 56 and the first device 52 as end points of the communication path 54, although it is understood that the display system 50 may have a different partition between the first device 52, the second device 56, and the communication path 54. For example, the first device 52, the second device 56, or a combination thereof may also function as part of the communication path 54.

The communication path 54 may be a variety of networks. For example, the communication path 54 may include wireless communication, wired communication, optical, ultrasonic, or the combination thereof. Satellite communication, cellular communication, BLUETOOTH®, Infrared Data Association standard (IrDA), wireless fidelity (WiFi), and worldwide interoperability for microwave access (WiMAX) are examples of wireless communication that may be included in the communication path 54. Ethernet, digital subscriber line (DSL), fiber to the home (FTTH), high-definition multimedia interface (HDMI) cable, and plain old telephone service (POTS) are examples of wired communication that may be included in the communication path 54.

Further, the communication path 54 may traverse a number of network topologies and distances. For example, the communication path 54 may include direct connection, personal area network (PAN), local area network (LAN), metropolitan area network (MAN), wide area network (WAN), or a combination thereof.

Figure 2:
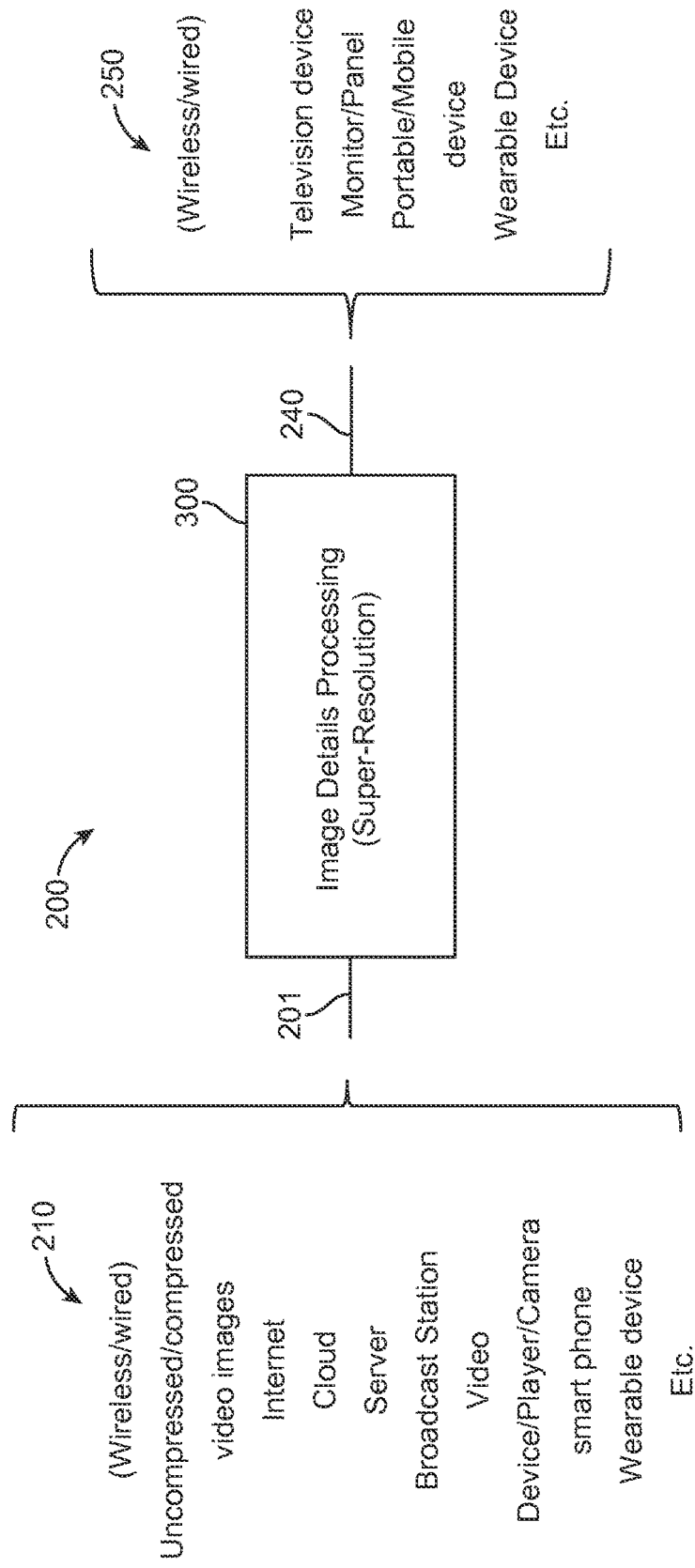
FIG. 2 shows an example high-level block diagram of a system, according to one embodiment.

FIG. 2 shows a high-level block diagram of a system 200, according to one embodiment. The system 200 includes an input node 201, an input source 210, an output node 240, an output source 250, and a super-resolution processor 300 interconnect between the input source 210 and the output source 250. In an example embodiment, the super-resolution processor 300 is deployed on the device 52 (or the device 56). For example, the input source 210 can correspond to a content provider (e.g., the device 56) coupled to the communication path 56 and connected to the device 52. The super-resolution processor 300 can correspond to an embedded microprocessor, integrated circuit (IC), hardware circuitry, multi-core processor, an application specific IC (ASIC), CPU, etc. of the device 52. The output source 250 can correspond to a display of the device 52 or a separate display device communicatively coupled to the device 52.

Although components of the system 200 have been described as being including be particular components of the electronic system 50, it will be appreciated that the components of the system 200 can be distributed in any suitable manner within the electronic system 50 in alternative embodiments.

In one embodiment, the system 200 may process input video images from the input source 210 received at the input node 201 using the super-resolution processor 300, output video images at the output node 240 and display the images on an output source 250 (or device 52, FIG. 1).

In one embodiment, the display for an output source 250 may be a physical device for presenting the image or multi-media presentations. For example, as described in connection with devices 52 and 56, the display may be a screen, including a liquid crystal display (LCD) panel, a plasma screen, a projection screen, a heads-up-display (HUD), etc. In other embodiments, the display may be projected on an object or reflection device.

In one embodiment, the input video images may be provided from an input source 210, which may be transmitted/received wirelessly or through a wired interface and may include uncompressed/compressed video content. In one embodiment, wireline or wireless communication of video imaging content in system 200 may include communication on/over one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1× enhanced voice-data only (EV-DO) or 1×EV-DO Gold Multicast) system, an IEEE 802.11 system, a DMB (Digital Multimedia Broadcasting) system, an orthogonal frequency division multiple access (OFDM) system, a DVB-H (Digital Video Broadcasting-Handheld) system, etc.

In one embodiment, the video input source 210 may be transmitted over a wireless network (e.g., Internet, local area network (LAN), wide-area network (WAN), personal area network (PAN), campus wireless network (CAN), metropolitan area network (MAN), etc.). In one embodiment, the input source 210 may arise from a cloud-based system, a server, a broadcast station, a video device/player, a video camera, a mobile device, etc.

In one embodiment, the video image input from the input source may be decoded/encoded (e.g., via a decoder/encoder) prior to arriving at the input node 201. In one embodiment, the video image output from the output node 240 to an output source 250 may be encoded/decoded prior to arriving at the output node. In one embodiment, the output source 250 may receive the output image from the output node 240 wirelessly or through a wire interface.

In one embodiment, compressed video image content from an input source 210 may provide analog or digital video from a broadcast, computer network, a DVD or other computer readable storage medium, or any other suitable source of video signals. In one embodiment, the compressed video from an input source 210 may be coupled to a receiver via a radio frequency interface (such as ATSC broadcasts), a computer network, or a wired or wireless connection such as a component video cable, a DVI or HDMI video interface, etc. In one embodiment, an uncompressed video image from an input source 210 may include one or more of a video camera, or a memory device such as a disk drive coupled to a receiver by any suitable video interface. In one embodiment, the uncompressed video from an input source 210 may provide uncompressed video in analog or digital form including in the form of luminance and chrominance, in individual color intensities such as red, green and blue, etc., or in any other suitable format.

In one embodiment, digital video formats for input video content from an input source 210 may include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. For example, high definition formats (such as supported by digital video broadcast standards) may be modified to a format that fits the format of a display device of an output source 250. The display device of an output source 250 may be configured to receive NTSC, PAL, ATSC, DVB/T, etc., or display device running at frame rates, such as 70 Hz, 75 Hz, 80 Hz, etc.

In video enhancement, one key challenge is to generate more details for texture regions while reducing the possible ringing artifacts along non-texture edges. In order to deal with this challenge, in one embodiment a texture map, a dominant directional edge map (which is presented by neighborhood data correlation strength), and a gain map are introduced to control detail enhancement strengths by the super-resolution processor 300. The texture map measures the possibility of a pixel being texture; the dominant directional edge map measures the uniformity of local edge directions, i.e., the possibility of a pixel being a non-texture edge; and the gain map incorporates different features and generates the final gain factors for each pixel, such that the factors for texture pixels are large and the factors for edge pixels are small. The boundary accuracy in the super-resolution outputs, however, are often not well preserved due to inaccuracy in the above feature maps, which controls the enhancement strengths of details. The control factor for one pixel needs other pixels' information in a local window, and sometimes dilation or smoothness operations may be needed to remove noise. Therefore, the control strengths are often blurred at boundaries between two different regions, e.g., a texture region and a non-texture region. The inaccuracy leads to unsatisfied super-resolution results. In one or more embodiments, an accurate super-resolution technique is employed by the super-resolution processor 300 that preserves boundary accuracy using image segmentation processing.

In one embodiment, the super-resolution processor 300 incorporated in a video processing device (e.g., device 52, FIG. 1) performs the following processing. The super-resolution processor 300 performs fast image segmentation by first transforming the image frame (i.e., input image frame) color space to hue, saturation value (HSV) space, which is more robust under illumination change. A color probability map is generated to indicate the likelihood of a pixel being a color pixel or a gray pixel. An adaptively selected threshold is then determined to separate the image frame into a color portion and gray portion. H and V spaces are used to build histograms for the color portion and the gray portion, respectively. An adaptive process is performed to select peaks from the histograms as cluster centers. Each pixel is labeled the same to its closest cluster. As such, the video processing device adaptively selects peaks from the histograms to limit a number of labels from a label map, which increases hardware processing speed.

In one embodiment, after the fast segmentation, the segmentation map is used by the super-resolution processor 300 to generate a boundary accurate texture map. Given the raw texture map produced by local intensity sign change analysis based on Zero Cross Counting, for each pixel, its neighboring pixels' texture probability are analyzed. The super-resolution processor 300 only considers neighboring pixels having the same segmentation label with the concerned pixel. The percentage of strong texture (likely probability of being a texture pixel) pixels and weak texture pixels (likely probability of being a non-texture pixel) are computed. If the difference of the two is over a predetermined threshold, the texture probability is used as the local average with a "big" updating factor.

In one embodiment, the super-resolution processor 300 generates an accurate dominant directional edge map. The dominant directional edge map is typically derived from 2D data correlation analysis and usually contains noise, which is previously removed by a dilation operation. In one embodiment, the local maximum data correlation value is used from the pixel with the same segmentation label with the concerned pixel. In addition, the correlation value is limited to not exceed (1—texture probability), such that strong correlation responses in the texture regions are removed.

In one embodiment, the super-resolution processor 300 generates an accurate gain map. The super-resolution processor 300 performs smoothing on the gain map from the result produced by applying fuzzy logic that includes a combination of the feature maps (segmentation map, texture map, and the directional edge map) as it may be necessary to reduce noise. The gain map is smoothed using local pixels with the same segmentation labels, such that boundaries between different regions are not blurred.

In one embodiment, the super-resolution processor 300 uses the feature maps as weight factors to control the detail enhancement strength. A Discrete Cosine Transform (DCT) is applied to an input image patch, which is delivered to A Harmonious Frequency Padding process to generate 16×16 DCT components from an 8×8 DCT. After the super-resolution processor 300 performs an Inverse Discrete Cosine Transform (IDCT), the upscaled image frame is produced. The detail change for each pixel is then enhanced or reduced by the produced gain map as strength factors.

Furthermore, the video processing device can process the input video frame of a digital video in accordance with the flowchart 301 (FIG. 3) to provide accurate detail enhancement by preserving clear boundaries between different pixel regions, provides stability across video frames and adaptively selects values for key parameters according to the input video frame to provide enhanced video during unconstraint conditions (e.g., TV content). The details of the above-processing and the super-resolution processor 300 are described in greater detail later in connection with FIGS. 3-4.

Figure 3:
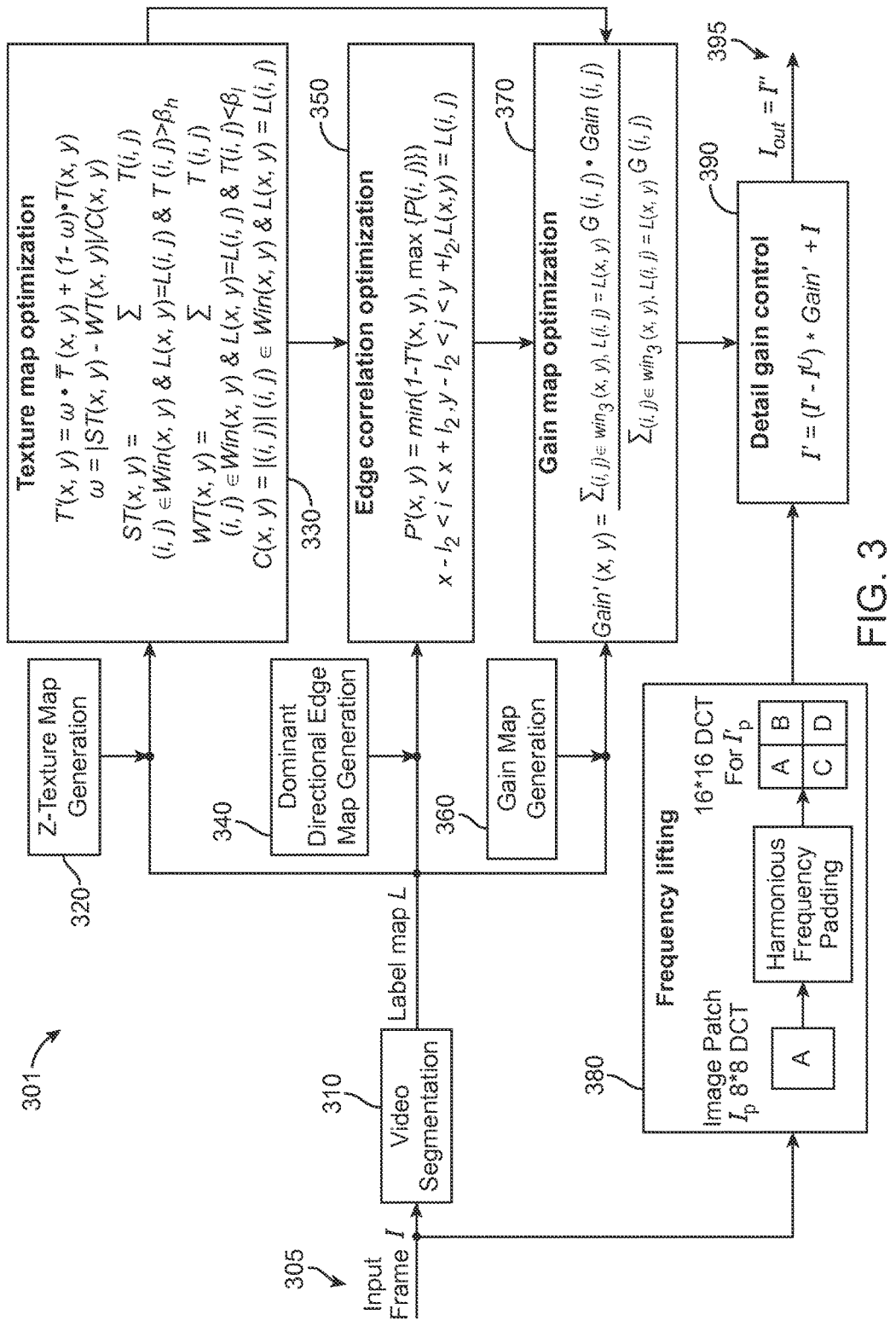
FIG. 3 shows a flowchart for a super-resolution processor, according to an embodiment.

FIG. 3 shows a flowchart 301 for super-resolution processing by the super-resolution processor 300 (FIG. 2), according to an embodiment. In one embodiment, the processing blocks shown in flowchart 301 may be incorporated onto the super-resolution processor 300 for incorporation into an electronic device, e.g., a device 52 or a device 56 (FIG. 1). In one embodiment, the processing blocks shown in flowchart 301 includes the following: a (video) segmentation block 310, a Z-texture map generation block 320, a texture map optimization block 330, a dominant directional edge map generation block 340, an edge correlation optimization block 350, a gain map generation block 360, a gain map optimization block 370, a frequency lifting block 380 and a detail gain control block 390. It should be noted that the processing blocks of FIG. 3 may each be a separate processing portion or processor on a microchip, multi-core processor, ASIC or IC, and may be combined with other processing portions or processors, etc.

Illumination changes often lead to large variations in red green blue (RGB) color space or YUV color space, but the hue channel in HSV space is often less sensitive to such changes. However, hue becomes invalid when the pixel is not a color pixel.

Figure 4:
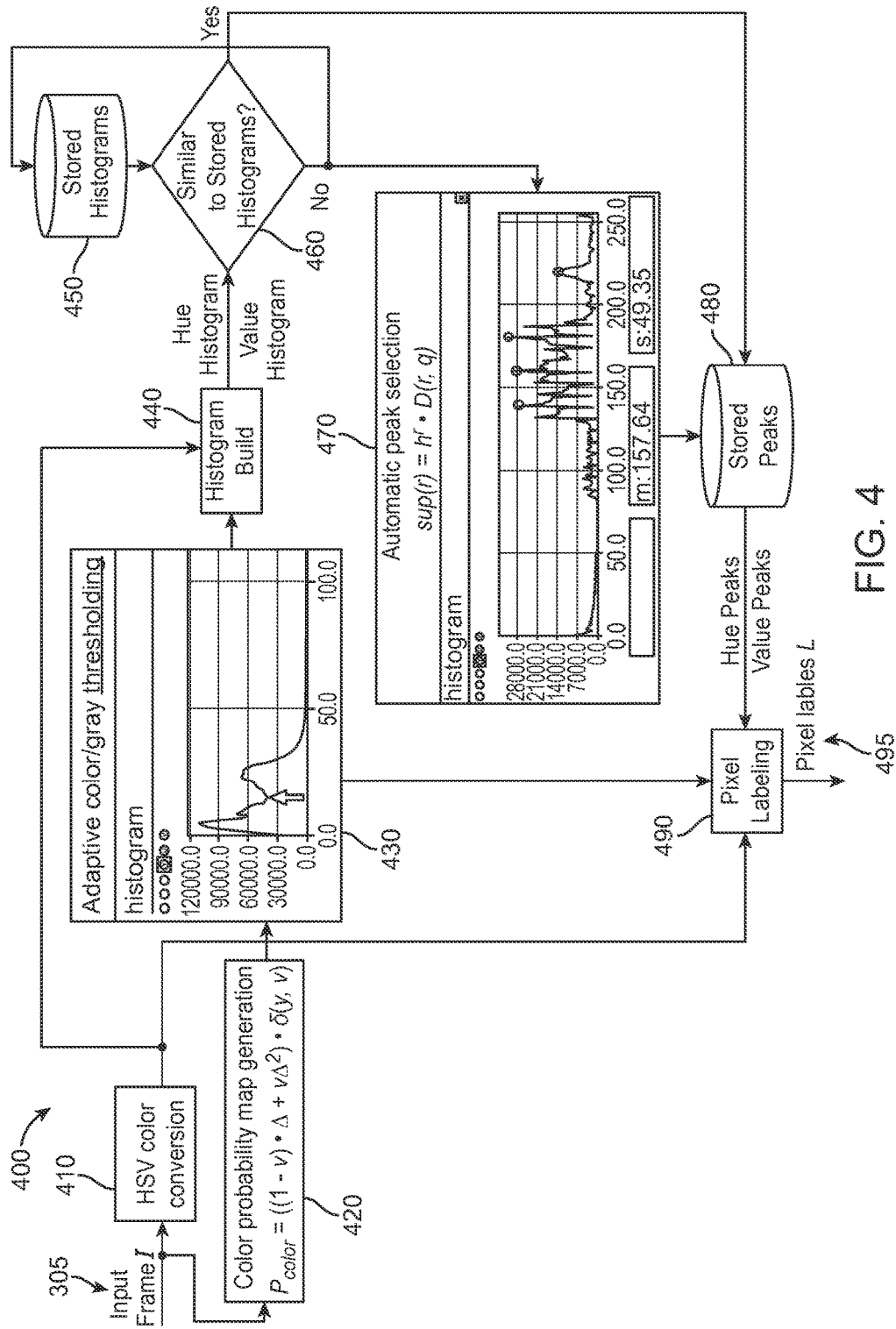
FIG. 4 shows a flowchart for fast segmentation processing, according to an embodiment.

FIG. 4 shows a flowchart for fast segmentation processing performed by the super-resolution processor 300 (FIG. 2) in the segmentation block 310, according to an embodiment. In one embodiment, in block 410 the input image frame 305 (FIG. 3) is transformed from the color space to HSV space. Given an input image frame 305 I, in one embodiment in the color probability map generation block 420 the input image frame 305 is first separated into two sub-images $I_{color}$ and $I_{gray}$; the color pixels are clustered based on their hue (H) channel, and the gray pixels are clustered based on their value (V) channel. In one embodiment, in order to separate the image, a color probability map is generated in block 420.

In one embodiment, for a pixel p, its Y value is defined in the YUV space as y, its RGB values as (r, g, b), and its HSV values as (h, s, v). It is assumed that all values have been normalized to [0, 1]. The saturation, $$S = \frac{\Delta}{v} = \frac{(\max(r, g, b) - \min(r, g, b))}{\max(r, g, b)},$$

is often considered as a measure of colorfulness. However, the saturation becomes less powerful when v is small, as it is sensitive to small variations of the value channel. In addition, when the pixel is dark, i.e., small values for y or v, color becomes less noticeable. On the other hand, Δ itself is less sensitive to small variations of v, but the same Δ is less sensible to a human eye when v is big. Therefore, in block 420 the pixel color probability is defined as $$P_{color} = ((1 - v)\Delta + v\Delta^2) \cdot \delta(y, v)$$

$$\delta(y, v) = \begin{cases} 1 & \text{if } y > \theta_1, v > \theta_2 \\ 0 & \text{otherwise} \end{cases}$$

where $\theta_1$ and $\theta_2$ are predetermined thresholds. In one example, this definition considers all the above issues together, and the color probability map is therefore more robust.

Figure 5:
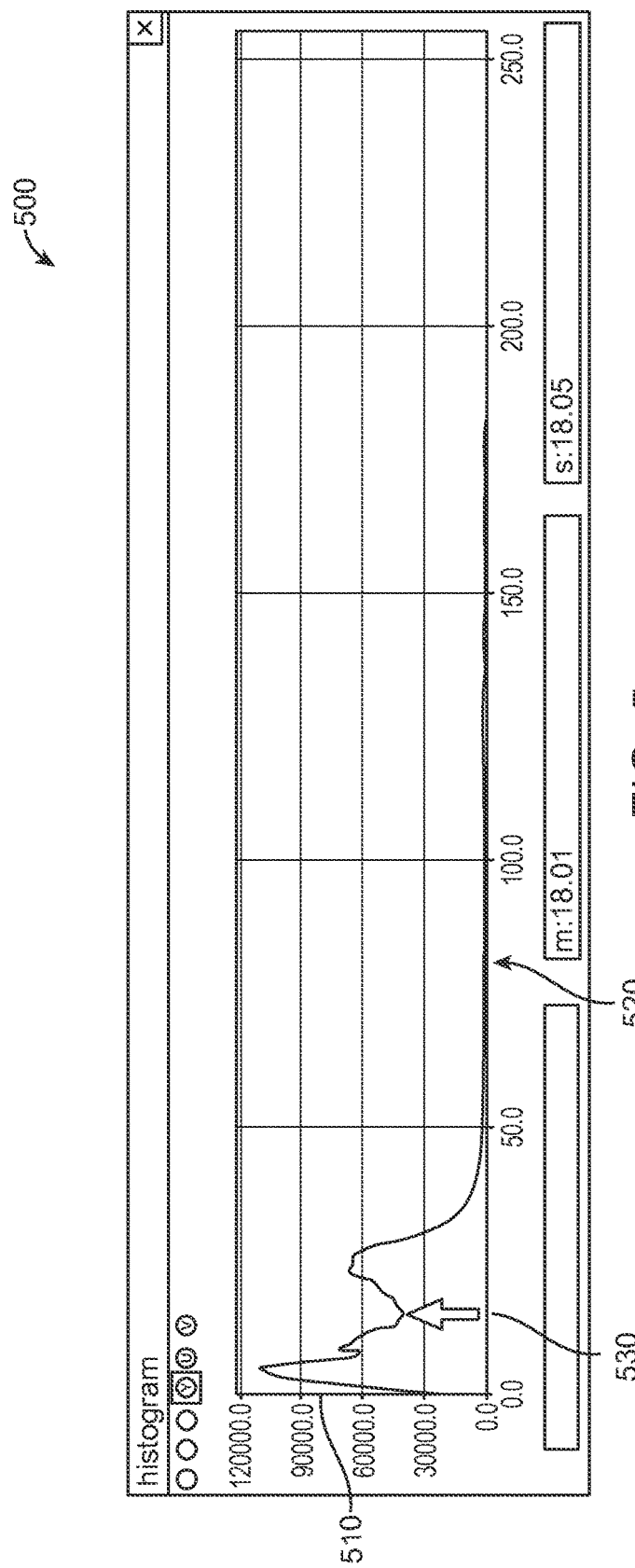
FIG. 5 shows an example graph for automatically selecting a threshold for color and gray pixel separation, according to one embodiment.

In one embodiment, after generation of the color probability map in block 420, a probability histogram is obtained. FIG. 5 shows an example graph 500 showing a histogram that is used for automatically selecting a threshold for color and gray pixel separation, according to one embodiment. The x axis 510 shows the color probability normalized to [0,255], and the Y axis 520 shows the numbers of pixels for color probabilities. The histogram (e.g., histogram 500) is used in an adaptive color and gray thresholding block 430. The default threshold t for separation of color and gray pixels is set to the value used in the previous input image frame 305. Then the threshold is shifted to the local minimum in a small local window in the histogram [t−σ, t+σ], where σ is a range parameter. The shift repeats until the threshold is the local minimum in the small local window, or it shifts to the maximum difference ρ with the threshold used in the previous frame to avoid temporal inconsistency. An example of the adaptive selected threshold is labeled by the arrow 530.

In one embodiment, after separation of color and gray pixels, in the histogram build block 440 a hue histogram is obtained for the former and a value histogram for the latter. In block 460 the hue histogram and the value histograms are compared with the stored histograms 450 for the previous image frame by using a similarity function as $$S(H_i, H_j) = \sum_{k=1}^{n} \sqrt{h_i^k \cdot h_j^k}$$

where $H_i=\{h_i^1, \ldots, h_i^n\}$ and $H_j=\{h_j^1, \ldots, h_j^n\}$ are two histograms whose sums of elements have been normalized to one, and k and n are positive integers. If the similarity is higher than a threshold, the stored histogram peaks 480 for the previous image frame are used; otherwise, new peaks are selected in the automatic peak selection block 470 as discussed below.

Figure 6:
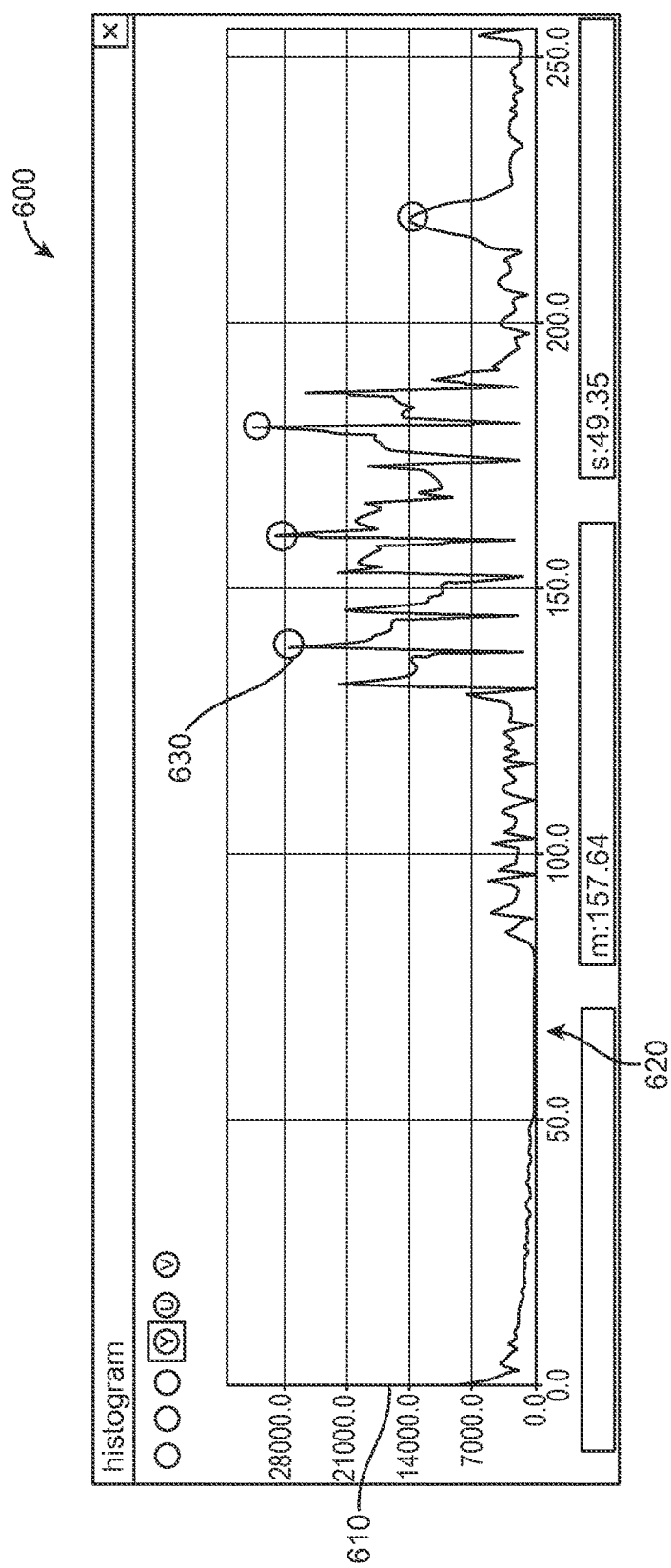
FIG. 6 shows an example graph for automatically selecting histogram peaks, according to one embodiment.

FIG. 6 shows an example graph 600 for automatically selecting histogram peaks, according to one embodiment. The X axis 610 represents the hue for color pixels' histogram or the intensity for gray pixels' histogram and the Y axis 620 represents the numbers of pixels in histogram bins. In the automatic peak selection block 470, given a histogram of hues of values, the super-resolution processor 300 (FIG. 2) first chooses the bin q as a cluster center for histogram h, where $h^q=\max\{h^1, \ldots, h^n\}$. Histogram bins locating within [q−w, q+w] are defined as "invalid", i.e., not for peak selection. For other histogram bins, a suppression function is defined as $$\sup(r)=h^r \cdot D(r,q)$$

where D (r, q) is the bin distance between bin r and bin q. If sup (r)<γ, bin r is labeled as "invalid." Then the next valid bin is selected with the max histogram count as the next cluster center. The above process is repeated until $$\forall r \in [1,n] h^r < T \text{ or } r \text{ is invalid}$$

where $T=\max\{\max\{h^1, \ldots, h^n\}\cdot \omega_1, N\cdot\omega_2\}$, $\omega_1$ and $\omega_2$ are two weight factors, and N is the total number of pixels in the frame. Example cluster centers are shown with a circle 630 in graph 600.

In one embodiment, after obtaining the cluster centers, the super-resolution processor 300 (FIG. 2) classifies each pixel to its closest center in the histogram in the pixel labeling block 490 (FIG. 4) to output pixel labels L 495 (FIG. 4). In one embodiment, a label or segmentation map is defined as $L=\{L(x, y)\}$, where $x \in [1, W]$, $y \in [1, H]$, W is the width of the upscaled frame, and H is the height of the upscaled frame.

Returning to FIG. 3, in one embodiment, L is used to improve boundary accuracy of the texture map in the Z-texture map generation block 320. In one embodiment, given a raw texture map $T=\{T(x, y)\}$, larger values indicate higher possibilities of being texture as opposed to non-texture. As texture depends on neighboring pixels, the texture probabilities of neighboring pixels should not change much if these pixels belong to the same region. In the Z-texture map generation block 320, for each pixel (x, y), the texture probability of neighboring pixels are checked in a small window $$Win_1(x,y)=\{(i,j)|x-l_1<i<x+l_1, y-l_1<j<y+l_1\}$$

where $l_1$ is a range parameter. The number of same label pixels in Win(x, y) is defined as $$C(x,y)=|(i,j)|(i,j) \in Win(x,y) \& L(x,y)=L(i,j)|$$

where |(i,j)| indicates the number of satisfied (i,j). The average texture strength in the same region is defined as $$\bar{T}(x,y)=\Sigma_{(i,j) \in Win(x,y) \& L(x,y)=L(i,j)} T(i,j)/C(x,y).$$

If the segmentation labels are correct, $\bar{T}(x, y)$ is more accurate than T(x, y). However, as the segmentation block 310 may have its own error, in the texture map optimization block 330 the texture probability is not always updated, but first checked whether the local texture values are stable. In one embodiment, the strengths of "strong" and "weak" texture pixels are respectively defined as $$ST(x, y) = \sum_{(i,j) \in Win(x,y) \& L(x,y)=L(i,j) \& T(i,j) > \beta_h} T(i, j)$$

$$WT(x, y) = \sum_{(i,j) \in Win(x,y) \& L(x,y)=L(i,j) \& T(i,j) < \beta_l} T(i, j)$$

where $\beta_h > \beta_l$ are both predetermined thresholds. If the difference between ST and WT is large, it indicates the local texture values are not stable, and therefore should be updated in the texture map optimization block 330. The new texture strength T'(x,y) is set as $$T'(x,y)=\omega \cdot \bar{T}(x,y)+(1-\omega) \cdot T(x,y)$$

where $\omega=|ST(x,y)-WT(x,y)|/C(x,y)$. After such an update, an improved boundary is preserved in the texture map.

In the dominant directional edge map generation block 340, a direction edge map is generated by the super-resolution processor 300 (FIG. 2). The limitation of raw dominant directional edge map generated by 2D data correlation analysis is that it does not necessarily generate a spatial consistent map, and a dilation operation is often needed to remove small noise. Such dilation would spread the correlation strengths across different regions, leading to blurred boundaries. In one embodiment, in the edge correlation map optimization block 350 the dilation is limited under the segmentation label and texture strength control as $$P'(x,y)=\min(1-T(x,y), \max\{P(i,j)\}) x-l_2<i<x+l_2, y-l_2<j<y+l_2, L(x,y)=L(i,j)$$

where P(i,j) is the raw neighborhood data correlation strength for pixel (i,j) produced by 2D data correlation analysis, $l_2$ is a range parameter, and P'(x, y) is the new correlation strength. Such definition limits the dilation within the pixels with the same label to avoid crossing region boundaries. Meanwhile, high texture strength indicates low probability of non-texture edges. In one embodiment, the data correlation strength is bounded by 1−T'(x, y) to further remove errors in texture regions.

The gain map is generated in the gain map generation block 360, and is used to control the enhancement strength of details in super-resolution, and the gain control factors are estimated by utilizing texture value and dominant directional edge value for each pixel. To maintain spatial stability, the gain map needs to be smoothed. A Gaussian kernel $G(x,y)=\{G(i,j)\}$ $(i,j) \in Win_3(x,y)$, where $l_3$ is a range parameter, and $Win_3(x,y)=\{(i,j)\} x-l_3 < i < x+l_3, y-l_3 < j < y+l_3$ is often used. Similar to the above feature maps, such operation blurs the boundaries between different regions.

In one embodiment, in the gain map optimization block 370 the smooth operation is only applied within local pixels with the same segmentation label as $$Gain'(x, y) = \frac{\sum_{(i,j) \in Win_3(x,y), L(i,j)=L(x,y)} G(i, j) \cdot Gain(i, j)}{\sum_{(i,j) \in Win_3(x,y), L(i,j)=L(x,y)} G(i, j)}$$

where Gain(i,j) and Gain'(i,j) are the original and new gain factors at pixel (i,j) respectively.

In one or more embodiments, with the above control maps, the super-resolution processor 300 (FIG. 2) is able to adjust detail enhancement strengths to improve high frequency details as well as reducing ringing artifacts in the frequency lifting block 380. Given an image patch $I_p$ with the size of 8×8, the super-resolution processor 300 (FIG. 2) first obtains its DCT coefficient matrix A=DCT ($I_p$). The HFP is applied to A to generate a 16×16 DCT coefficient matrix F=HFP (A). Then, an IDCT process is applied to generate the upscaled image patch $I'_p$=IDCT (F). All patches are processed to produce the upscaled full image I'.

In one embodiment, in the detail gain control block 390, the super-resolution processor 300 (FIG. 2) may determine the details enhancement for all pixels by subtracting $I^U$ from I', where $I^U$ is the upscaled image of I by an up-scaler without super-resolution effect, e.g., bilinear or bicubic. However, some enhancements need to be further boosted, e.g., the texture region, and some enhancements need to be reduced because they lead to ringing artifacts.

In one embodiment, the above generated gain map Gain' is applied as a control factor for the detail enhancement strengths by the super-resolution processor 300 (FIG. 2) in the detail gain control block 390 as $$I''(x,y)=(I'(x,y)-I^U(x,y)) \cdot Gain'(x,y)+I'(x,y)$$

where I" is outputted as the final super-resolution output image frame 395 (FIG. 3) output result. In one embodiment, the super-resolution output image frame 395 is received by or transmitted to an output source (e.g., device 52, FIG. 1, or output source 250, FIG. 2) wirelessly or through a wire interface (e.g., via communication path 54) and displayed on a display device (e.g., a TV device or monitor).

Figure 7:
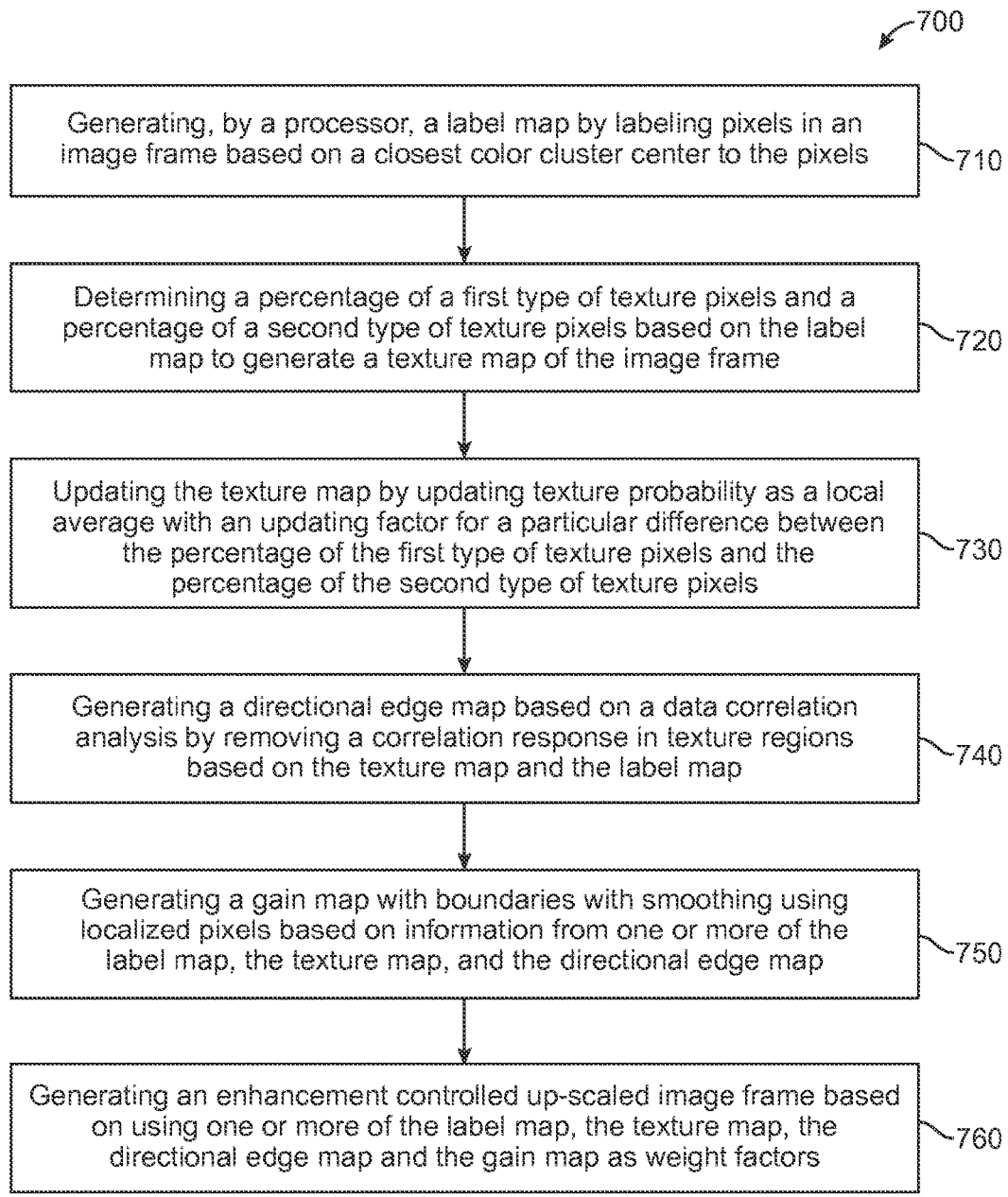
FIG. 7 shows an example flow diagram for a process that generates a super-resolution image frame from an input image frame using fast segmentation for boundary accuracy control, according to an embodiment.

FIG. 7 shows an example flow diagram of a process 700 that generates a super-resolution image frame (e.g., super-resolution image frame 395, FIG. 3) from an input image frame (e.g., image frame 305, FIG. 3) using fast segmentation (e.g., using video segmentation block 310, FIGS. 3-4) for boundary accuracy control, according to an embodiment. In one embodiment, block 710 generates, by a processor (e.g., super-resolution processor 300, FIG. 2), a label map by labeling pixels in an image frame based on a closest color cluster center to the pixels (e.g., from the video segmentation block 310, FIGS. 3-4). In block 720 the process 700 determines a percentage of a first type of texture pixels (e.g., a "strong" type) and a percentage of a second type of texture pixels (e.g., a "weak" type) based on the label map to generate a texture map of the image frame (e.g., using processing from the Z-texture map generation block 320, FIG. 3). In block 730 the process 700 updates the texture map by updating texture probability as a local average with an updating factor for a particular difference between the percentage of the first type of texture pixels and the percentage of the second type of texture pixels (e.g., using processing from the texture map optimization block 330 (FIG. 3).

In one embodiment, in block 740 process 700 generates a directional edge map based on a data correlation analysis by removing a correlation response in texture regions based on the texture map and the label map (e.g., using processing from the dominant directional edge map generation block 340, FIG. 3). In block 750 process 700 generates a gain map with boundaries and smoothing using localized pixels based on information from one or more of the label map, the texture map, and the directional edge map (e.g., using processing from the gain map generation block 360). In block 760 process 700 generates an enhancement controlled upscaled image frame based on using one or more of the label map, the texture map, the directional edge map and the gain map as a weight factor (e.g., using processing from the detail gain control block 390).

In one embodiment, process 700 may generate the label map based on generating a color probability map based on a likelihood of pixels of the image frame being a color pixel or a gray pixel, and separating the image frame into a color portion and a gray portion using the color probability map and a predetermined threshold (e.g., using processing from the segmentation block 310, FIGS. 3-4). In one embodiment, process 700 may further generate the label map based on generating histograms of color clusters and gray clusters based on the color portion and the gray portion, and adaptively selecting peaks from the histograms as color cluster centers (e.g., using processing from the segmentation block 310, FIGS. 3-4).

In one embodiment, color pixels are clustered into the color clusters based on hue channel and gray pixels are clustered into the gray clusters based on value channel. In one example, the pixels in the label map bear a segmental label of a cluster it belongs to, and the segmental label indicates intensity and distinguishes a color pixel from a gray pixel.

In one embodiment, process 700 may adaptively select peaks from the histograms to limit a number of labels from the label map to increase hardware processing speed (e.g., using processing from the segmentation block 310, FIGS. 3-4). In one embodiment, in process 700 the first type of texture pixels is based on a first threshold, the second type of texture pixels is based on a second threshold; and the first threshold is greater than the second threshold.

In one embodiment, process 700 generates the enhancement controlled upscaled image using the gain map to adjust detail enhancement strengths optimizes high frequency details (e.g., using processing from the gain map optimization block 370, FIG. 3) and reduces ringing artifacts (e.g., using processing from the frequency lifting block 380, FIG. 3). In one embodiment, the processor uses the gain map to control enhancement strength of pixel details in super-resolution by distinguishing boundaries between a non-texture pixel region and a texture pixel region.

In one embodiment, process 700 may include the processor using the directional edge map to limit dilation within pixels with a same label to avoid crossing boundaries between non-texture pixel regions and texture pixel regions (e.g., using processing from the edge correlation map optimization block 350, FIG. 3), and data correlation strength that indicates probability of a texture pixel region or a non-texture pixel region is bounded to remove errors in texture pixel regions (e.g., using processing from the texture map optimization block 330, FIG. 3).

Figure 8:
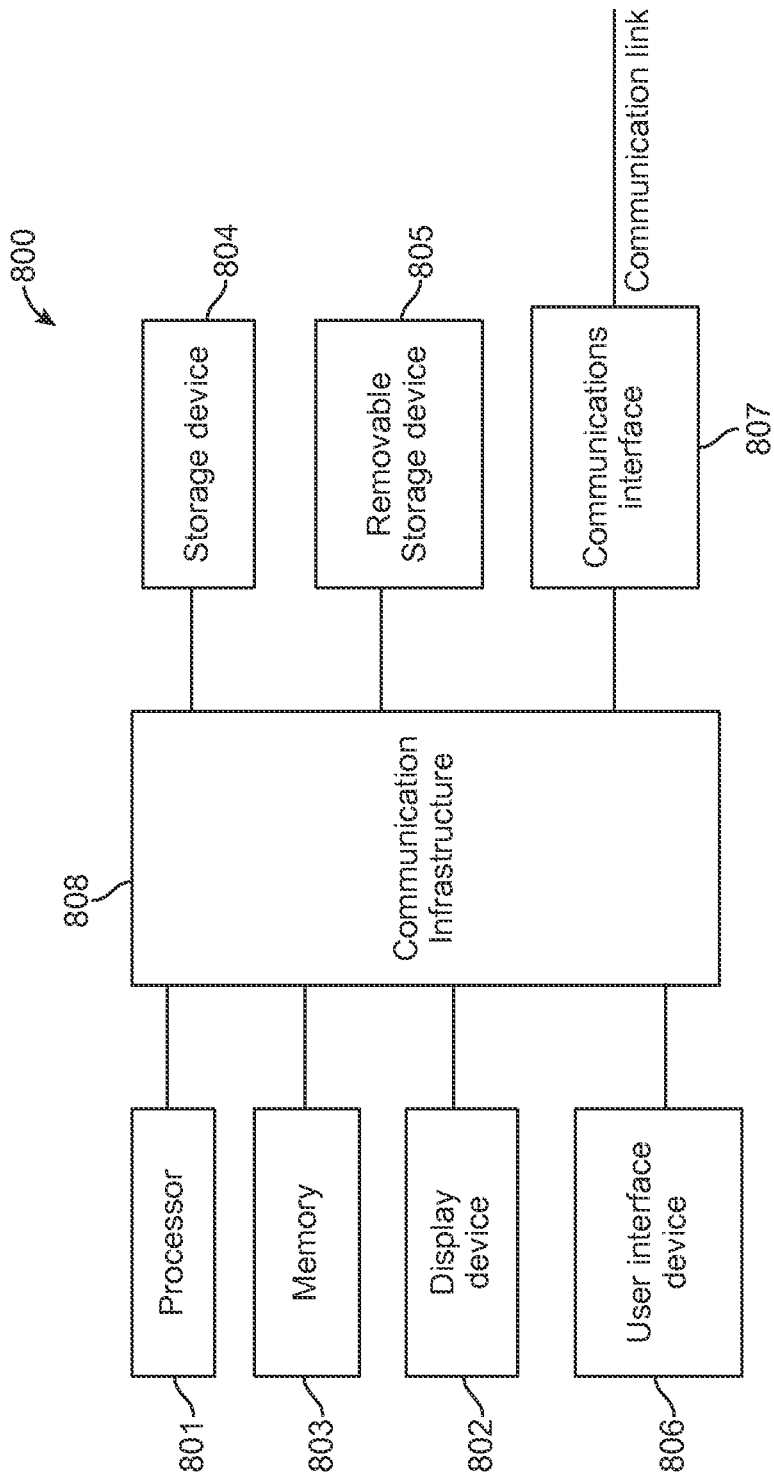
FIG. 8 is an exemplary high-level block diagram showing an information processing system comprising a computer system useful for implementing disclosed embodiments.

FIG. 8 is a high-level block diagram showing an information processing system comprising a computer system 800 useful for implementing the disclosed embodiments. Computer system 800 may be incorporated in a device 52, 56, FIG. 1, or devices 210 or 250, FIG. 2). The computer system 800 includes one or more processors 801 e.g., (e.g., the super-resolution processor 300, FIG. 2), and can further include an electronic display device 802 (for displaying video, graphics, text, and other data), a main memory 803 (e.g., random access memory (RAM)), storage device 804 (e.g., hard disk drive), removable storage device 805 (e.g., removable storage drive, removable memory module, a magnetic tape drive, optical disk drive, computer readable medium having stored therein computer software and/or data), user interface device 806 (e.g., keyboard, touch screen, keypad, pointing device), and a communication interface 807 (e.g., modem, a network interface (such as an Ethernet card), a communications port, or a PCMCIA slot and card). The communication interface 807 allows software and data to be transferred between the computer system and external devices (e.g., over communication path 54, FIG. 1). The system 800 further includes a communications infrastructure 808 (e.g., a communications bus, cross-over bar, or network) to which the aforementioned devices/modules 801 through 807 are connected.

Information transferred via communications interface 807 may be in the form of signals such as electronic, electromagnetic, optical, or other signals capable of being received by communications interface 807, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for flowchart 301 (FIG. 3) and processing instructions for process 700 (FIG. 7) may be stored as program instructions on the memory 803, storage device 804 and the removable storage device 805 for execution by the processor 801.

Embodiments have been described with reference to flowchart illustrations and/or block diagrams of methods, apparatus (systems) and computer program products. Each block of such illustrations/diagrams, or combinations thereof, can be assisted by or implemented as computer program instructions. The computer program instructions when provided to a processor produce a machine, such that the instructions, which execute via the processor, create means for implementing the functions/operations specified in the flowchart and/or block diagrams. Each block in the flowchart/block diagrams may represent a hardware and/or software process or logic. In alternative implementations, the functions noted in the blocks may occur out of the order noted in the figures, concurrently, etc.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "interface," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   generating, by a processor, a label map by labeling pixels in an image frame based on a closest color cluster center to the pixels;
   determining a percentage of a first type of texture pixels and a percentage of a second type of texture pixels based on the label map to generate a texture map of the image frame;
   updating the texture map by updating texture probability as a local average with an updating factor for a particular difference between the percentage of the first type of texture pixels and the percentage of the second type of texture pixels;
   generating a directional edge map based on a data correlation analysis by removing a correlation response in texture regions based on the texture map and the label map;
   generating a gain map with boundaries and smoothing using localized pixels based on information from one or more of the label map, the texture map, and the directional edge map; and
   generating an enhancement controlled upscaled image frame based on using one or more of the label map, the texture map, the directional edge map and the gain map as a weight factor.

2. The method of claim 1, wherein generating the label map further comprises:
   generating a color probability map based on a likelihood of pixels of the image frame being a color pixel or a gray pixel; and
   separating the image frame into a color portion and a gray portion using the color probability map and a predetermined threshold.

3. The method of claim 2, wherein generating the label map further comprises:
   generating histograms of color clusters and gray clusters based on the color portion and the gray portion; and
   adaptively selecting peaks from the histograms as color cluster centers.

4. The method of claim 3, wherein color pixels are clustered into the color clusters based on hue channel and gray pixels are clustered into the gray clusters based on value channel.

5. The method of claim 4, wherein the pixels in the label map bear a segmental label of a cluster it belongs to, and the segmental label indicating intensity and distinguishing a color pixel from a gray pixel.

6. The method of claim 5, wherein adaptively selecting peaks from the histograms limits a number of labels from the label map to increase hardware processing speed.

7. The method of claim 1, wherein the first type of texture pixels is based on a first threshold, the second type of texture pixels is based on a second threshold, and the first threshold is greater than the second threshold.

8. The method of claim 6, wherein generating the enhancement controlled upscaled image using the gain map to adjust detail enhancement strengths optimizes high frequency details and reduces ringing artifacts.

9. The method of claim 1, wherein the processor uses the gain map to control enhancement strength of pixel details in super-resolution by distinguishing boundaries between a non-texture pixel region and a texture pixel region.

10. The method of claim 1, wherein the processor uses the directional edge map to limit dilation within pixels with a same label to avoid crossing boundaries between non-texture pixel regions and texture pixel regions, and data correlation strength that indicates probability of a texture pixel region or a non-texture pixel region is bounded to remove errors in texture pixel regions.

11. An apparatus comprising:
a memory device configured to receive an image frame; and
a processor configured to:
generate a label map by labeling pixels in the image frame based on a closest color cluster center to the pixels;
determine a percentage of a first type of texture pixels and a percentage of a second type of texture pixels based on the label map to generate a texture map of the image frame;
update the texture map by updating texture probability as a local average with an updating factor for a particular difference between the percentage of the first type of texture pixels and the percentage of the second type of texture pixels;
generate a directional edge map based on a data correlation analysis by removing a correlation response in texture regions based on the texture map and the label map;
generate a gain map with boundaries and smoothing using localized pixels based on information from one or more of the label map, the texture map, and the directional edge map; and
construct an enhancement controlled upscaled image frame based on using one or more of the label map, the texture map, the directional edge map and the gain map as a weight factor.

12. The apparatus of claim 11, wherein the processor is further configured to:
generate a color probability map based on a likelihood of pixels of the image frame being a color pixel or a gray pixel; and
separate the image frame into a color portion and a gray portion using the color probability map and a predetermined threshold.

13. The apparatus of claim 12, wherein the processor is further configured to:
generate histograms of color clusters and gray clusters based on the color portion and the gray portion; and
adaptively select peaks from the histograms as color cluster centers.

14. The apparatus of claim 13, wherein the processor is configured to cluster color pixels into the color clusters based on hue channel, and to cluster gray pixels into the gray clusters based on value channel.

15. The apparatus of claim 11, wherein the pixels in the label map bear a segmental label of a cluster it belongs to, and the segmental label indicating intensity and distinguishes a color pixel from a gray pixel.

16. The apparatus of claim 15, wherein the processor is configured to adaptively select peaks from the histograms to limit a number of labels from the label map to increase hardware processing speed.

17. The apparatus of claim 11, wherein the first type of texture pixels is based on a first threshold, the second type of texture pixels is based on a second threshold, and the first threshold is greater than the second threshold.

18. The apparatus of claim 17, wherein the processor is configured to generate the enhancement controlled upscaled image using the gain map to adjust detail enhancement strengths to optimize high frequency details and to reduce ringing artifacts.

19. The apparatus of claim 11, wherein the processor is configured to:
use the gain map to control enhancement strength of pixel details in super-resolution to distinguish boundaries between a non-texture pixel region and a texture pixel region; and
use the directional edge map to limit dilation within pixels with a same label to avoid crossing boundaries between non-texture pixel regions and texture pixel regions; and
bound data correlation strength that indicates probability of a texture pixel region or a non-texture pixel region to remove errors in texture pixel regions.

20. The apparatus of claim 11, wherein the processor is embedded in a microchip of an electronic television device.

21. A non-transitory processor-readable medium that includes a program that when executed by a processor performs a method comprising:
generating, by the processor, a label map by labeling pixels in an image frame based on a closest color cluster center to the pixels;
determining a percentage of a first type of texture pixels and a percentage of a second type of texture pixels based on the label map to generate a texture map of the image frame;
updating the texture map by updating texture probability as a local average with an updating factor for a particular difference between the percentage of the first type of texture pixels and the percentage of the second type of texture pixels;
generating a directional edge map based on a data correlation analysis by removing a correlation response in texture regions based on the texture map and the label map;
generating a gain map with boundaries and smoothing using localized pixels based on information from one or more of the label map, the texture map, and the directional edge map; and
generating an enhancement controlled upscaled image frame based on using one or more of the label map, the texture map, the directional edge map and the gain map as a weight factor.

22. The non-transitory processor-readable medium of claim 21, wherein generating the label map further comprises:
generating a color probability map based on a likelihood of pixels of the image frame being a color pixel or a gray pixel; and
separating the image frame into a color portion and a gray portion using the color probability map and a predetermined threshold.

23. The non-transitory processor-readable medium of claim 22, wherein generating the label map further comprises:
generating histograms of color clusters and gray clusters based on the color portion and the gray portion; and
adaptively selecting peaks from the histograms as color cluster centers.

24. The non-transitory processor-readable medium of claim 23, wherein color pixels are clustered into the color clusters based on hue channel and gray pixels are clustered into the gray clusters based on value channel.

25. The non-transitory processor-readable medium of claim 21, wherein the pixels in the label map bear a segmental label of a cluster it belongs to, and the segmental label indicating intensity and distinguishing a color pixel from a gray pixel.

26. The non-transitory processor-readable medium of claim 25, wherein adaptively selecting peaks from the histograms limits a number of labels from the label map to increase hardware processing speed.

27. The non-transitory processor-readable medium of claim 21, wherein the first type of texture pixels is based on a first threshold, the second type of texture pixels is based on a second threshold, and the first threshold is greater than the second threshold.

28. The non-transitory processor-readable medium of claim 26, wherein generating the enhancement controlled upscaled image using the gain map to adjust detail enhancement strengths optimizes high frequency details and reduces ringing artifacts.

29. The non-transitory processor-readable medium of claim 21, wherein the processor uses the gain map to control enhancement strength of pixel details in super-resolution by distinguishing boundaries between a non-texture pixel region and a texture pixel region.

30. The non-transitory processor-readable medium of claim 21, wherein the processor uses the directional edge map to limit dilation within pixels with a same label to avoid crossing boundaries between non-texture pixel regions and texture pixel regions, and data correlation strength that indicates probability of a texture pixel region or a non-texture pixel region is bounded to remove errors in texture pixel regions.

\* \* \* \* \*